Jan. 15, 1929.    R. SCHNITZER    1,699,024
SPEED CONTROL SYSTEM FOR ELECTRIC MOTORS
Filed Oct. 25, 1927
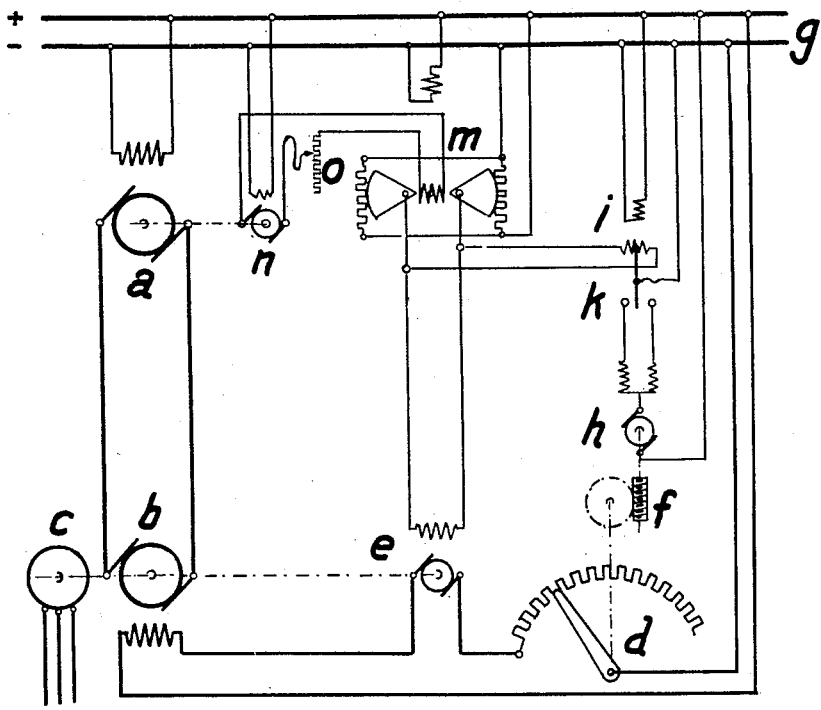
INVENTOR
RICHARD SCHNITZER
BY Alfred H. Dyson
ATTORNEY Patented Jan. 15, 1929.

1,699,024

UNITED STATES PATENT OFFICE.

RICHARD SCHNITZER, OF ZURICH, SWITZERLAND, ASSIGNOR TO AKTIENGESELL-SCHAFT BROWN BOVERI & CIE., OF BADEN, SWITZERLAND, A JOINT-STOCK COMPANY OF SWITZERLAND.

SPEED-CONTROL SYSTEM FOR ELECTRIC MOTORS.

Application filed October 25, 1927, Serial No. 228,572, and in Germany October 8, 1926.

This invention relates to improvements in speed control systems for electric motors.

When the range of speed regulation required in an electrical installation is wide and at the same time must be performed in fine steps, the ordinary type of quick-acting regulator is not suitable for the reason that from both a structural and an economical standpoint it is impractical to provide a regulator of this type which would be of such size and which would have the requisite number of regulating steps to meet these conditions. In such cases, it has been the practice heretofore to abandon the quick-acting regulator with its various advantages and to employ a comparatively slow-acting regulating system wherein the so-called servo motors are employed.

One of the objects of the present invention is to provide an improved speed regulating system for electric motors combining the advantages of the quick-acting regulator for fine adjustment with the comparatively slow-acting regulator or system for coarse adjustment.

Another object is to provide an improved speed regulating system for electric motors which is reliable and which operates to maintain the speed of the motor constant at any value within wide limits.

Other objects and advantages will hereinafter appear.

According to the present invention, it is possible to make use of quick-acting regulation with very finely graduated steps between extremely wide limits without sacrificing economy. This is done by suitably combining quick-acting regulating apparatus for the fine regulation with a second regulating apparatus for coarse regulation, the arrangement being such that when the fine regulator is in either of its extreme positions the coarse regulator is brought into action, movement of the coarse regulator then allowing the fine regulator to return automatically to one of its intermediate positions whereat the operating gear for the coarse regulator is caused to come to rest.

For the purpose of illustrating the invention, one embodiment thereof is shown in the drawing which is a schematic layout of a speed control system for electric motors embodying the present improvements.

The present embodiment of the improved system is based on the principle of the Ward Leonard control, the driving motor $a$ being supplied from a generator $b$ driven by a three-phase motor $c$. The speed of motor $a$ is regulated by varying the field of generator $b$ by means of either a rheostat $d$ connected in the field circuit of the generator for coarse regulation thereof or a booster dynamo $e$ for fine adjustment and which is also connected in the field circuit of generator $b$, as shown, and is capable of either adding or subtracting voltage so as to give a wide range of regulation. The rheostat $d$ is operated by the reversible auxiliary motor $h$ through a worm gear $f$. The motor $h$ is connected to the constant voltage D. C. mains $g$ from which the exciting current for the various machines is obtained, and is started up in one direction or the other by the operation of the polarized relay $i$ through the medium of the switch $k$. The operating coil of relay $i$ is connected to the contact segments of the quick-acting regulator $m$, the resistances of which are joined in parallel, potentiometer fashion, so that there is no potential difference between the segments when the same are in their middle or neutral position, whereas when the segments are in either of their limit positions the potential difference between the same is at a maximum positive or negative value to effect operation of relay $i$ in one direction or the other. The operating coil of the quick-acting regulator $m$ is connected to a tachometer dynamo $n$ driven from motor $a$, as indicated. This regulator performs the fine regulation, i. e., it maintains the speed of the motor $a$ constant by varying the field of the dynamo $e$ in the required direction, the dynamo being driven from motor $c$, as indicated. The voltage applied to the regulator $m$ by the tachometer dynamo $n$ may be varied by means of the variable resistance $o$.

The operation of the system is as follows:

Under normal working conditions, the quick-acting regulator $m$ is sufficient by itself for maintaining constant speed, fluctuations in the speed of the motor $a$ within certain limits operating through the tachometer dynamo $n$ and the quick-acting regulator $m$ to vary the field excitation of dynamo $e$ such that the latter supplies the required addition or subtraction of voltage in the field circuit of the Ward Leonard generator $b$.

The arrangement is such that under normal working conditions the necessary regulation is effected by the quick-acting regulator $m$ without the segments thereof reaching either of their limit positions.

A large fluctuation in the speed of motor $a$, or a readjustment of the motor speed by varying resistance $o$, will cause the contact segments of the quick-acting regulator $m$ to move to one or the other of their limit positions whereat the potential difference between the segments is at a maximum and is sufficient to excite relay $i$ and cause operation of switch $k$ to start the motor $h$ in a direction depending on the sense in which relay $i$ operates. At the same time, the dynamo $e$ is fully excited and is either boosting or depressing the voltage in the field circuit of the Ward Leonard generator $b$ accordingly.

Auxiliary motor $h$ operates rheostat $d$ until the voltage generated by the tachometer $n$ has been varied sufficiently to allow the contact segments of regulator $m$ to return to one of their intermediate positions whereat the potential difference between the segments is either zero or of such small value as to permit relay $i$ to return to its central position to open switch $k$ and stop the motor $h$. The main or driving motor $a$ then continues to run at the desired speed, the fine regulation being effected again solely by the quick-acting regulator $m$ and the associated dynamo $e$.

The drawing illustrates but one of the many forms in which the invention may be embodied. Numerous modifications are possible in the individual parts as well as in the general arrangement of those parts. The method of regulation disclosed, furthermore, may be applied to the solution of many other problems other than that described in the foregoing. The rolling contact regulator $m$, has been shown as being of the general type disclosed in Patent 1,003,600 of September 19, 1911, to Guttinger.

The new system is not only suitable for speed regulation, however, but may be applied to regulation of all kinds. Thus it is particularly suitable for the regulation of voltage, current and power in power stations and transmission or distribution systems, or for power factor control in alternating current networks. The invention is also applicable to synchronous condensers used for maintaining unity power factor in a system or for maintaining constant voltage on a line by varying the excitation of the machine between positive and negative values

The invention claimed is:

1. In a speed-control system for electric motors, a motor, means having a given operating range and being operable within such range to control the speed of said motor, means responsive to speed conditions of said motor beyond the range of operation of said first-named means for restoring such conditions to within the operating range of said first-named means, said first-named means including apparatus comprising a resistance unit and an operating segment complementary to and having rolling contacting engagement with said unit, and means forming part of said second-named means and being responsive to voltage conditions of said apparatus and being operable in accordance therewith to control operating action of said second-named means.

2. In a speed-control system for electric motors, a motor, a supply generator therefor, and means responsive to the speed of said motor for varying the field strength of said generator inversely to such speed, said means comprising a dynamo in the field circuit of said generator and having a field winding, means responsive to the speed of said motor for controlling the excitation of said winding and having an intermediate position at which such excitation is zero and limit positions either side of said intermediate position at which such excitation is a maximum, a rheostat in said field circuit, means for operating said rheostat, and means responsive to conditions whereat said controlling means is in either of its limit positions for causing operation of said operating means.

3. In a speed-control system for electric motors, a motor, means having a given operating range and being operable within such range to control the speed of said motor, said means including parallel-connected resistances and operating segments therefor having a neutral position and limit positions on either side thereof, and means responsive to conditions whereat said segments are in either of said limit positions for controlling the speed of said motor beyond the operating range of said first-named means.

4. In a speed-control system for electric motors, a motor, a supply source, control means having a given operating range and being operable within such range to control the speed of said motor, said control means including parallel-connected resistances connected across said supply source and operating segments for said resistances having a neutral position of zero potential with respect thereto, a dynamo driven from said motor and connected to said control means for governing the same in accordance with the motor speed, second control means for said motor, and governing means for said second control means connected across said segments and responsive to a predetermined potential difference between the same.

5. In a control system for electrical apparatus, means having a given operating range and being operable within such range to control operating conditions of said apparatus, means responsive to operating conditions of said apparatus beyond the range of operation of said first-named means for restoring such conditions to within the operating range of said first-named means, a device forming part of said first-named means, and comprising a resistance unit and an operating segment complementary to and having rolling contacting engagement with said unit, and means forming part of said second-named means and being responsive to voltage conditions of said device and being operable in accordance therewith to control operating action of said second-named means.

In testimony whereof I have hereunto subscribed my name this 10 day of October A. D. 1927.

RICHARD SCHNITZER.